March 28, 1944.   T. P. HOGAN   2,345,394
HATCH CONSTRUCTION FOR SHIPS
Filed June 18, 1943
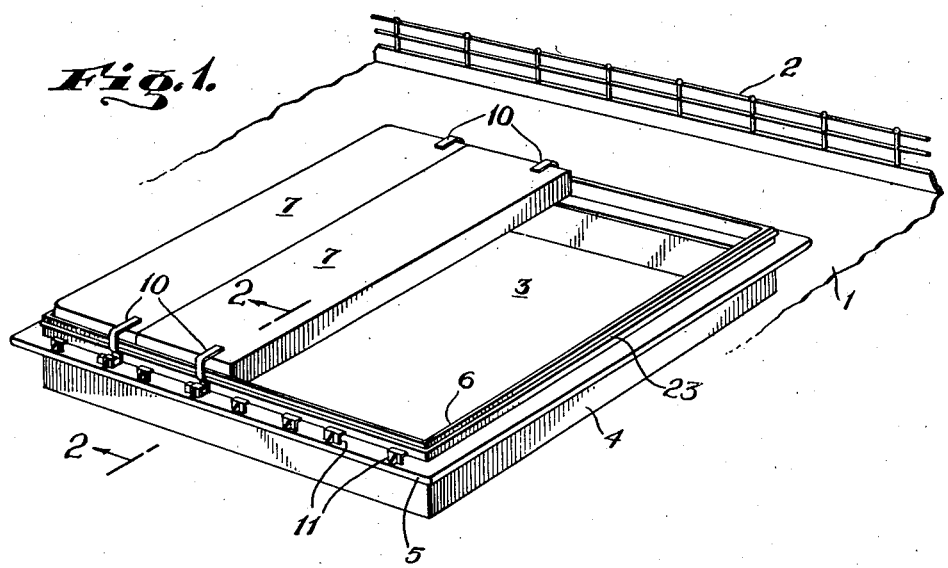
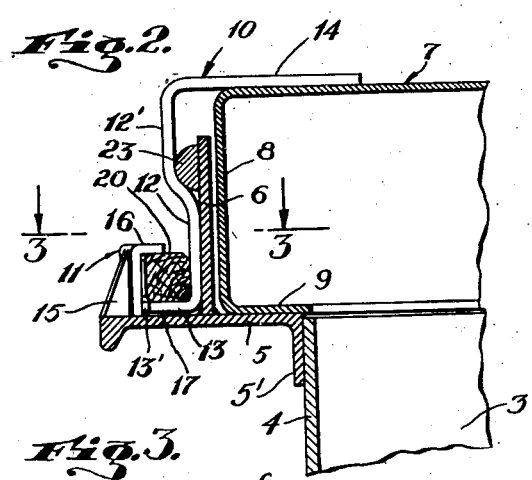
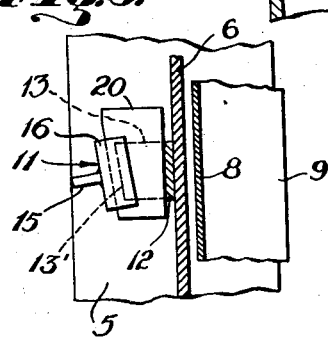
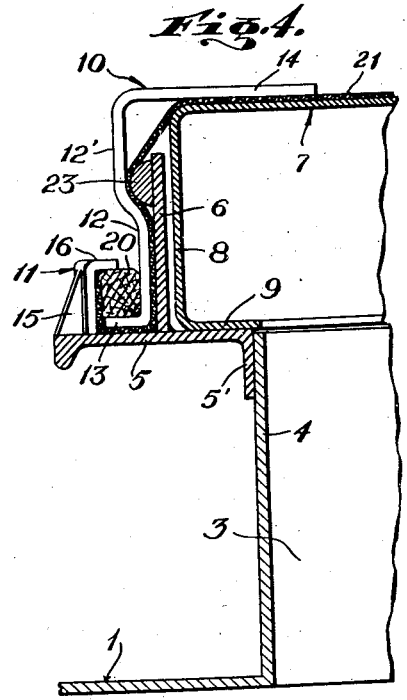
INVENTOR
THOMAS P. HOGAN
BY
Bartlett, Eyre, Keel & Weymouth
ATTORNEYS Patented Mar. 28, 1944

2,345,394

UNITED STATES PATENT OFFICE 2,345,394

HATCH CONSTRUCTION FOR SHIPS

Thomas P. Hogan, Wilmington, Del.

Application June 18, 1943, Serial No. 491,326

9 Claims. (Cl. 114—203)

This invention relates to ship construction and particularly to hatches, hatch covers, and means for locking the same in position.

Ship hatches are usually provided with hatch covers which are ordinarily held in place or battened down by clamping bars and a tarpaulin cover is usually fastened over the covers. When the ship is being loaded or unloaded, certain of the pontoon hatch covers need to be removed in order to get access to the cargo holds. Unless means are provided for locking the hatch covers, which are not removed, firmly in position the cargo hooks are apt to engage and dislodge a remaining hatch cover, dropping it into the hold and endangering the life of a stevedore. Many stevedores have heretofore been injured while working down in the cargo holds due to hatch covers falling upon them.

The conventional method of locking these hatch covers in position is to form oval openings through the base flanges of the pontoon covers and through the bulb angles and to provide special locking bolts and keys for clamping the hatch covers to the bulb angle. This old method is expensive, non-water-tight, and also objectionable because of the waste of valuable materials.

One object of the invention is a method and means for firmly locking the hatch covers in position which are free from the defects of the conventional system, namely a means which is more economical and less expensive, is watertight against the entrance of sea wash, conserves materials, and may be assembled into locking position or disassembled with marked facility.

For a better understanding of the invention reference may be had to the accompanying drawing wherein Fig. 1 is a perspective view of a hatch and hatch cover embodying the invention.

Fig. 2 is a cross section along the line 2—2 of Fig. 1.

Fig. 3 is a section along the line 3—3 of Fig. 2, and

Fig. 4 is a view similar to Fig. 2, showing the possibility of utilizing the invention to lock the hatch covers in position with the tarpaulin thereover.

Referring to the drawing, I have illustrated my invention as embodied in a ship comprising a deck 1, a railing 2, and a hatch 3 leading down to the cargo hold. The side walls of the hatch are indicated at 4 and a bulb angle or support 5 is carried by the side walls 4 which extends around the hatch. This bulb angle support is formed of L shape in section with the flange 5' fastened to the outside of the side walls 4 in any suitable manner. Hatch coamings 6 are mounted upon the bulb angles 5 and around the hatch, these coamings being disposed substantially midway of the upper or supporting flange of bulb angle 5, and secured thereto in any suitable manner, as by welding.

The hatch covers are indicated at 7 and these covers consist of elongated pieces of sheet metal having their ends turned over at right angles to form end closures 8. These end closures 8 are in turn formed with right angle parts or flanges 9 which rest upon the bulb angle. In Fig. 1 certain of these hatch covers 7 are removed for gaining access to the cargo hold through the hatch 3 while certain of these hatch covers 7 are still retained in position.

These remaining hatch covers 7 are firmly and rigidly locked against dislodgement by special clamping bars 10, cleats 11, and wedges 20. There are at least two bar clamps 10 for each hatch cover 7, namely one for each end, and if desired, more than one such bar clamp may be employed for each end of the hatch cover. Each bar clamp comprises a main body part 12, a foot or lower flange part 13 turned at right angles to the main body part and an elongated gripping or holding flange part 14 which engages and firmly grips the upper surface of the end of the hatch cover. Each of the cleats 11 is carried on the outer edge of the bulb angle 5 and is fastened thereto in any suitable manner, as for example by welding. These cleats are of conventional construction, embodying a triangular web 15 disposed at right angles to the main body of the cleat, the latter having an upper gripping or wedge engaging part 16. Each cleat is disposed at a slight angle to the coaming 6 so as to facilitate insertion and the removal of the wedges 12, the latter being illustrated as tapered for facilitating these operations. The lower part 13 of the bar clamp which is engaged by the bottom of the wedge 12 is formed at an angle 13' corresponding to the angular position of the cleat 11.

It is noted that the bar clamp stops short of the coaming 5, the foot part 13 of the clamp being spaced as indicated at 17 from the coaming. Thus when the wedges 12 are driven home the body part 12 of the clamp bar is wedged tightly against the coaming 6 while the clamping or gripping part 14 of the bar is caused to bear down upon the hatch cover 7 and hold the same firmly against the bulb angle 5. Since both ends of the hatch cover 7 are thereby clamped in position the cover cannot be accidentally dislodged so as to endanger the lives of the stevedores.

The special bar clamps 10 may be readily assembled into position with the clamping parts 14 resting upon the hatch covers and then the wedges 20 may be driven in by any suitable tool to lock the cover 7 firmly against dislodgement. The wedges 20 may be driven out of their wedging position by the use of any suitable tool whereupon the special clamping bars 10 may be removed. These special clamps may be made up of ordinary flat bar steel, or wrought iron, requiring no special machinery and expensive methods of manufacture. The conventional oval openings through the flanges 9 and bulb angles 5 permitting entrance of sea wash into the holds are eliminated, together with the expensive conventional locking devices.

The cleats 11 and the wedges 20 may be utilized for holding the tarpaulin 21 over the cover 7 as indicated in Fig. 4 and thus these wedges and cleats serve a dual purpose. If desired the bar clamps 10 may be employed when the hatches are closed as indicated in Fig. 4, but ordinarily the special clamping bars are not needed when the ship is at sea since the hatch covers may then be held in place or battened down by the conventional clamping bars.

The hatch coamings 6 are provided near the upper edge and on the outside with rounded or bulbous shape protectors 23 which protect the tarpaulin 21 from engagement with the sharp corners of the upper edge of the coamings. The main body part 12 of each clamping bar is provided with an offset portion 12' to clear these rounded or bulbous shaped parts. The hatch covers 7 may have side closing flanges similar to the end closures 8, and likewise such side closures may, if desired, have inturned flanges similar to the flanges 9 projecting inwardly from the end closures 8. Preferably, the hatch covers 7 are of conventional construction.

I claim:

1. In a hatch construction for ships, a bulb angle member surrounding the hatch, hatch coamings carried by said bulb angle, hatch cover elements resting at their ends on said bulb angle and within said coamings, a clamp bar for each end of a cover element disposed on the outside thereof with one part engaging the end of the cover element and a main body part engaging the coamings, a cleat carried by the bulb angle and in spaced relation to the coaming and wedge means for wedging said clamp bar tightly against the coaming.

2. In a hatch construction for ships, a bulb angle member surrounding the hatch, hatch coamings carried by said bulb angle, hatch cover elements resting at their ends on said bulb angle and within said coamings, a clamp bar for each end of a cover element disposed on the outside thereof with one part engaging the end of the cover element and a main body part engaging the coamings, a cleat carried by the bulb angle and in spaced relation to the coaming and wedge means for wedging said clamp bar tightly against the coaming, said clamp bar having an out-turned flange spaced from the bulb angle, and said wedge means engaging said out-turned flange and holding the clamp bar tightly against the hatch cover.

3. In a hatch structure for ships, a bulb angle surrounding the hatch, hatch coamings carried by and rigidly fastened to the bulb angle at points intermediate the edges thereof, a hatch cover element bridging said hatch and resting at its ends on said bulb angle, said element being formed of sheet material and having its ends turned at right angles to the main body thereof to form end closures, and flanges turned inwardly from the end closures and resting upon the bulb angle, a clamping bar having a main body part in engagement with the coaming and an upper end part formed at right angles to the main body part and engaging the upper surface of the hatch cover and a lower flange part also formed at right angles to the main body part, cleats supported by said bulb angle in spaced relation with the coamings, and wedge means disposed between the cleat and the lower part of the clamping bar for clamping the clamp bar firmly against the outer surface of the coaming and against the upper surface of the hatch cover.

4. In a hatch structure for ships, a bulb angle surrounding the hatch, hatch coamings carried by and rigidly fastened to the bulb angle at points intermediate the edges thereof, a hatch cover element bridging said hatch and resting at its ends on said bulb angle, said element being formed of sheet material and having end flanges turned inwardly from the end and resting upon the bulb angle, a clamping bar having a main body part in engagement with the coaming and an upper end part formed at right angles to the main body part and engaging the upper surface of the hatch cover and a lower flange part also formed at right angles to the main body part, a cleat supported by said bulb angle in spaced relation with the coamings and wedge means disposed between the cleat and the lower part of the clamping bar for clamping the clamp bar firmly against the outer surface of the coaming and against the upper surface of the hatch cover, said cover flange and said bulb angle being imperforate.

5. In a hatch structure for ships, a bulb angle surrounding the hatch, hatch coamings carried by and rigidly fastened to the bulb angle at points intermediate the edges thereof, a hatch cover element bridging said hatch and resting at its ends on said bulb angle, said element being formed of sheet material having its ends turned at right angles to the main body thereof and flanges turned inwardly from the ends and resting upon the bulb angle, clamping bars each having a main body part in engagement with the coaming and an upper end part formed at right angles to the main body part and engaging the upper surface of the hatch cover and a lower flange part also formed at right angles to the main body part, cleats supported by said bulb angle in spaced relation with the coamings, and wedges disposed between the cleats and the lower parts of the clamping bars for clamping the bars firmly against the outer surface of the coamings and against the upper surface of the hatch cover, said cleats being disposed at angles to the coamings and said wedges each comprising a straight side in engagement with a clamp bar and a tapered side in engagement with an inclined cleat.

6. In a hatch construction, a bulb angle at the hatch, a hatch cover element bridging the hatch and resting at its ends on said bulb angle, a hatch coaming disposed at the end of the hatch cover element, a cleat fastened to and carried by said bulb angle at a point adjacent the end of the hatch cover element and spaced from the coaming, a clamping bar having a main body part with its upper and lower ends disposed at substantially right angles to the main body part to form inwardly and outwardly turned holding parts respectively, the inwardly turned part engaging the cover and holding it firmly against the bulb angle and the outwardly turned part of the bar being disposed between the coaming and the cleat, and said cleat having an inwardly turned gripping part disposed above the lower holding part of the bar and a wedge gripped therebetween.

7. In a hatch construction, a bulb angle at the hatch, a hatch cover element bridging the hatch, a hatch coaming disposed at the end of the hatch cover element and rigidly fastened to the bulb angle, a cleat fastened to and carried by said bulb angle at a point adjacent the end of the hatch cover element and spaced from the coaming, a clamping bar having a main body part with its upper and lower ends disposed at substantially right angles to the main body part to form inwardly and outwardly turned flanges respectively, the inwardly turned flange engaging the cover and the outwardly turned flange of the bar being disposed between the coaming and the cleat, and said cleat having an inwardly turned flange disposed above the lower flange of the bar and a wedge gripped therebetween, said cleat being disposed at an angle to the adjacent coaming and the outer edge of the flange at the lower end of the bar being formed at an angle corresponding to the angular position of the cleat.

8. In a ship hatch construction having a bulb angle, a coaming surrounding the hatch which is provided at its upper edge with an outer rounded protector surface for a tarpaulin passing thereover, a hatch cover resting on the bulb angle and supported thereby at a level above the upper edge of the coaming and wedging means for fastening the tarpaulin including a fixed cleat spaced from the coaming, a means for locking the hatch cover to the bulb angle independently of the tarpaulin comprising an elongated clamping member formed of flat metallic bar stock throughout and having its upper end inwardly turned to form a holding part for engaging the cover and its lower end bent outwardly at substantially right angles to form a foot wedging part of a length substantially shorter than the upper inwardly turned holding part and engaged by the wedging means and the portion of said clamping member adjacent the upper holding part being laterally and outwardly offset with respect to the portion thereof adjacent the lower holding part to clear said rounded protector surface, said wedging means including a part engaging between the cleat and foot wedging part.

9. In a ship hatch construction having a bulb angle, a coaming, a hatch cover resting on the bulb angle and supported thereby at a level above the upper edge of the coaming and wedging means for fastening a tarpaulin over the hatch comprising a fixed cleat spaced from the coaming and fastened to the bulb angle, a means for locking the hatch cover to the bulb angle independently of the tarpaulin comprising an elongated clamping member formed of flat metallic bar stock throughout and having a main body part disposed closely adjacent the coaming with its upper end inwardly turned to form a holding part engaging the cover and with its lower end bent outwardly at substantially right angles to form a foot wedging part of a length slightly less than the spacing distance between the coaming and the cleat and engaged by the wedging means to hold the main body part firmly against the side of the coaming and the inwardly bent part firmly against the upper surface of the hatch cover.

THOMAS P. HOGAN.